United States Patent [19]
Graham

[11] 3,946,191
[45] Mar. 23, 1976

[54] WELDING APPARATUS

[75] Inventor: Weldon Charles Graham, San Diego, Calif.

[73] Assignee: General Atomic Company, San Diego, Calif.

[22] Filed: Sept. 26, 1974

[21] Appl. No.: 509,336

[52] U.S. Cl.............................................. 219/125 R
[51] Int. Cl.² ............................................. B23K 9/00
[58] Field of Search ...................... 219/125 R, 60 A

[56] References Cited
UNITED STATES PATENTS

| | | | |
|---|---|---|---|
| 1,949,251 | 2/1934 | Gilbert | 219/125 R |
| 2,773,968 | 12/1956 | Martellotti et al. | 219/125 R X |
| 3,125,669 | 3/1964 | Hawthorne | 219/125 R |
| 3,159,734 | 12/1964 | Cooksey et al. | 219/125 R |
| 3,536,886 | 10/1970 | Juelg et al. | 219/125 R |

*Primary Examiner*—J. V. Truhe
*Assistant Examiner*—David A. Tone
*Attorney, Agent, or Firm*—Fitch, Even, Tabin & Luedeka

[57] ABSTRACT

Apparatus is described for welding a tube to a tube sheet in which the angular relationship of a weld torch supported in a rotor may be adjusted with respect to the rotor axis by changing or rotating a bushing in which the weld torch is supported in the rotor. The distance of the weld electrode from the axis of rotation of the rotor may also be separately adjusted.

5 Claims, 8 Drawing Figures

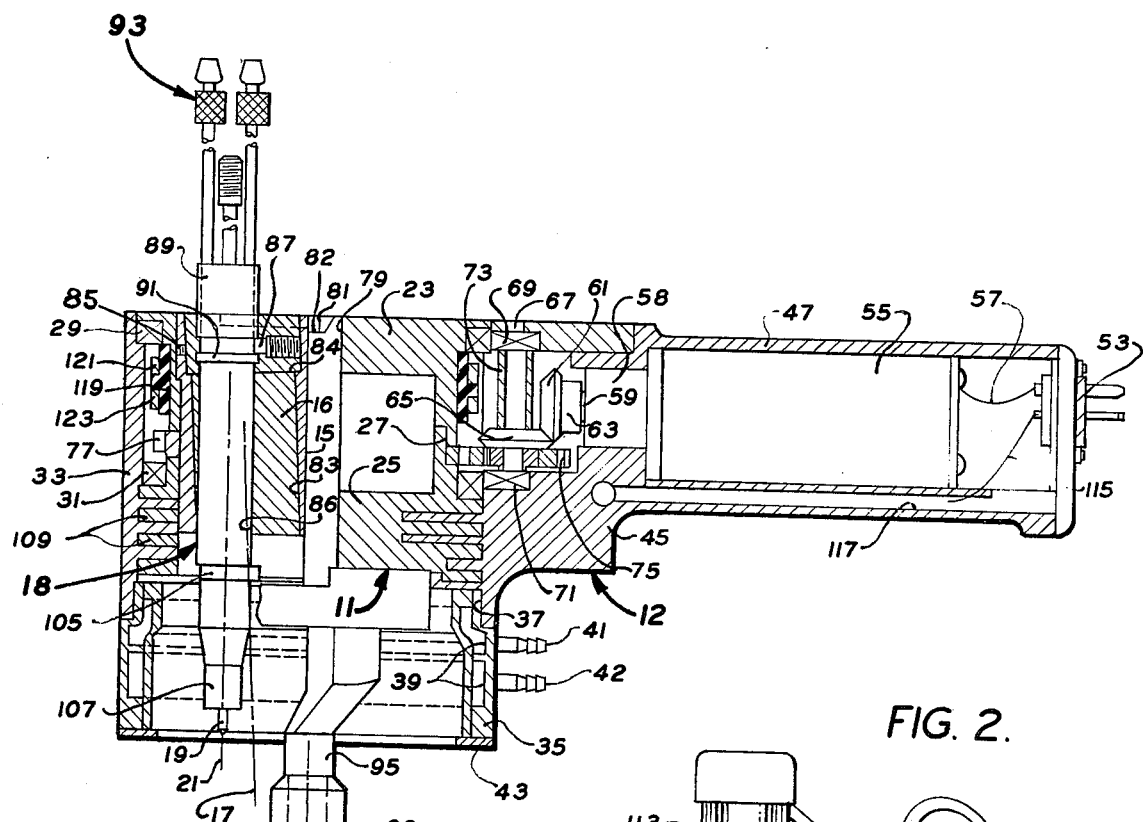

WELDING APPARATUS

This invention relates generally to apparatus useful in the manufacture of steam generators, condensers, heat exchangers, and similar devices. More particularly, the invention relates to an improved apparatus for welding a tube to a tube sheet.

Steam generators, condensers, heat exchangers and similar types of devices sometimes incorporate a tube sheet. Generally, a tube sheet comprises a flat or curved wall which may face on or define a chamber. The tube sheet has a plurality of holes therein for accommodating a corresponding plurality of heat exchanger tubes. The tubes communicate with the chamber to pass fluid into the chamber or to carry fluid from the chamber, depending upon the particular design of the device.

Typically, the tubes are secured to the tube sheet, with their ends flush or approximately flush with the tube sheet, by means of a weld. The weld extends around the end of the tube at the periphery of the hole into which the tube is inserted.

Steam generators or similar apparatus may have a large number of tubes to be joined to the tube sheet and it is therefore preferred that some automated or semi-automated means be available to perform this task. The design of automated means for welding a tube to a tube sheet is difficult due to the necessity for precisely locating the welding electrode with respect to the area to be welded, and for maintaining a high electrical current to the weld electrode.

One particularly satisfactory means of welding tubes to tube sheets involves the so-called tungsten inert gas (T.I.G.) process, wherein a shroud of inert gas is maintained in the region being welded, and wherein a tungsten welding electrode is utilized. The problem of conveying the inert gas to the weld area and maintaining it there further complicates the design of efficient and reliable automated apparatus for welding a tube to a tube sheet. In the event it is also desired to provide a filler material in the weld region, additional design problems arise.

A tube to tube sheet weld generally takes one of three forms. In one form, a tube is inserted in a hole in a plate with the tube flush with the top surface of the plate. In a second form, a tube is inserted in a hole in a plate with the tube projecting above the surface of the plate. In a third form, the tube is inserted in a hole in a plate with the tube recessed below the surface of the plate. While the welding of the tube to the tube sheet is similar in all three forms described above, in each case the preferred orientation or attitude of the tip of the welding torch with respect to the annular region of the weld is different. Where the tube is flush with the top surface of the plate, the weld tip or tungsten electrode attitude should be at a right angle to the surface of the plate. Where the tube projects beyond the plane of the plate, the axis of the weld tip should be inclined away from the center or axis of the tube. Where the tube is recessed from the surface of the plate, the axis of the electrode should be inclined toward the axis of the tube.

Prior art tube to tube sheet welding apparatus typically employs a locator which enters the tube being welded to position the weld torch in relation to the tube. The weld torch is then orbited around the region of the weld during the welding process. Additional welding wire may be provided to the area to either build up the weld for structural considerations or to provide the addition of material not available in the metal of the parts being joined to alloy the weld for strengthening purposes. Such prior art devices often have made no provision for varying the distance and attitude of the weld torch tip with respect to the weld region. Even where such provision is made, adjustment has often been difficult and of limited scope. In addition, provision for feeding welding wire into the weld area in such prior art devices has often been complex and relatively unsatisfactory in operation.

It is an object of the present invention to provide improved apparatus for welding a tube to a tube sheet.

Another object of the invention is to provide tube to tube sheet welding apparatus wherein the attitude of the weld torch electrode may be easily selected with respect to the weld region.

Another object of the invention is to provide tube to tube sheet welding apparatus having provision for positive feed of weld wire at an infinitely variable rate.

A further object of the invention is to provide tube to tube sheet welding apparatus which is of relatively simple construction and low in cost and yet provides high versatility in the type and size of weld accommodated.

Other objects of the invention will become apparent to those skilled in the art from the following description, taken in connection with the accompanying drawings wherein:

FIG. 1 is a full section side view of apparatus constructed in accordance with the invention;

FIG. 2 is a side elevational view of the apparatus of FIG. 1;

Figure 3:
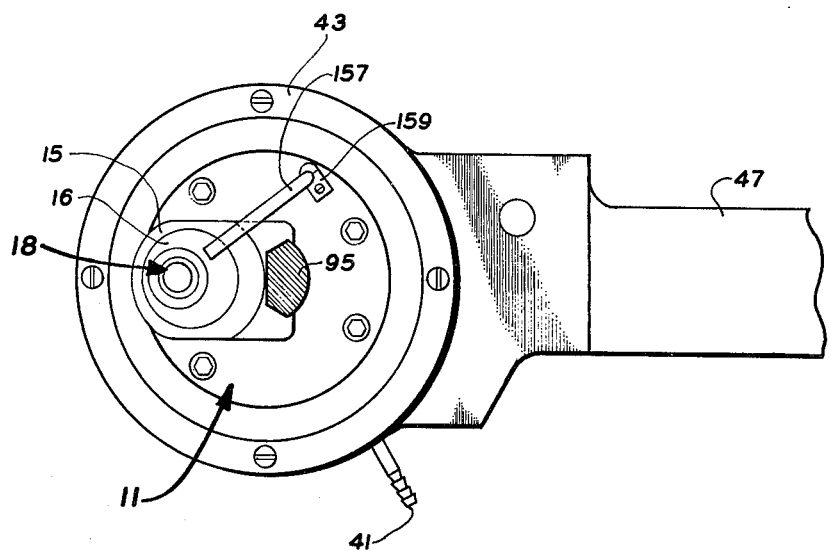
FIG. 3 is a bottom end view of the apparatus of FIG. 1.

Very generally, the apparatus of the invention includes a rotor 11 and means 12 for supporting and rotating said rotor about a rotor axis. Locator means 13 are provided for positioning the rotor axis with respect to the tube being welded. The rotor axis is indicated at 14. A bushing support 15 is mounted to the rotor for radial adjustment with respect to the rotor axis. A bushing 16 is supported offset from the rotor axis by the bushing support and is interchangeable therein. A weld torch 18 is supported in the bushing for rotation with respect thereto. The weld torch has a weld electrode 19 projecting therefrom on a tip axis 21. The relationship of the tip axis with respect to the bushing axis 17 is selectable by interchanging the bushing or by rotary adjustment of the bushing 16 with respect to the bushing support 15. This allows selection of the angular relation between the rotor axis 14 and the tip axis 21.

Referring now in greater detail to the invention as illustrated, the rotor 11 is formed in two parts or sections 23 and 25. The two sections mate together at an annular step 27 and are mounted by a pair of axially spaced annular ball bearings 29 and 31 for rotation in a main housing 33.

The main housing 33 supports the rotor and is provided with a replaceable water-cooled purge cover 35. The purge cover 35 is located in a machined recess 37 in the main housing 33 and is provided with a plurality of internal coolant passages 39. A suitable coolant, such as water, is circulated through the passages 39 to assist in conducting heat from the weld region and weld torch during the welding operation. Suitable connectors 41 and 42 are provided in the purge cover to conduct coolant to the passages in the purge cover.

An annular wear plate 43 is bolted to the lower terminus of the purge cover 35. The bottom side of the plate 43 establishes a fixed reference plane for the weld torch tip 19 and the surface of the tube sheet being welded. The plate 43 bears directly against the surface of the tube sheet and the spacing of the weld tip 19 from the surface of the tube sheet may be adjusted by loosening its clamp in the torch body.

The housing 33 is mainly of generally cylindrical shape but is provided with an appendage 45 from which extends an integral handle portion 47. Thus, the operator of the apparatus may support the apparatus manually by means of the handle portion 47. As may be seen in FIG. 2, a suitable control button 49, operable to actuate a microswitch 51, is provided to enable the operator to control the apparatus. A connector plug 53 is provided to connect the apparatus to a control console, not shown, of a type generally known in the art.

In order to provide power for rotating the rotor and thus orbit the weld tip 19 around the weld area, a drive motor 55 is provided mounted in the handle portion 47. Power to operate the motor 55 is carried by leads 57 extending from the plug 53 to the motor. The rotational speed of the motor 55 is adjustable by varying the voltage applied thereto. A motor shaft housing 58 projects from one end of the motor 55 and supports a motor shaft 59. The motor shaft rotates a miter gear 61 mounted on the motor shaft by a mounting collar 63. The miter gear 61 meshes with a miter gear 65 mounted at right angles thereto on a gear shaft 67. The gear shaft 67 is supported in the housing appendage 45 in bearings 69 and 71 axially spaced along the shaft. The bearings 69 and 71 are supported in suitably machined recesses in the housing appendage 45. A spacer sleeve 73 surrounds the shaft 67 between the bearing 69 and the miter gear 65.

Also fixed to the shaft 67 is a drive gear 75 which is rotatable on the shaft and is drivingly connected to the miter gear 65. The drive gear 75 engages a main rotor gear 77 which is secured to the rotor between the two sections 23 and 25 thereof at the stepped region 27. Suitable bolts and dowel pins, not shown, may be provided for attaching the gear 77 to the rotor. Thus, energization of the motor 55 causes rotation of the rotor 11 through the gear train.

Figure 5:
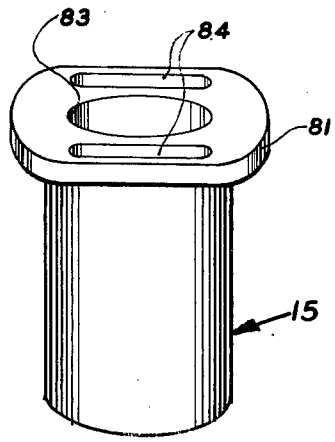
FIG. 5 is a perspective view of a bearing support used in the apparatus of the invention.

The rotor 11 is provided with a large slot 79 of rectangular cross section machined therein. The slot 79 extends axially all the way through the rotor 11 and also extends radially with respect to the axis of rotation 14 of the rotor, being radially asymmetric with respect thereto. The bushing support 15 is mounted in the slot 79. The bushing support 15, as may be seen in FIG. 5, is of circular cross section, being sufficiently small to move freely within the more narrowly spaced walls of the slot 79. Axial and rotational displacement of the bearing support 15 is prevented by a mounting flange 81 which is provided with straight sides mating in a rectangular recess or ledge 82 machined in the top of the housing 33. The recess 82 is made sufficiently large in the radial dimension so as to allow adjustment of the position of the bearing support 15 radially in the rotor with respect to the axis of rotation of the rotor. Accordingly, the bearing support 15 is restrained from being adjustable in any direction except radially with respect to the axis of rotation 14 of the rotor 11. Bolts, not shown, passing through slots 84, in the flange 81 and into the rotor may be used to lock the bushing support 15 in position.

A hole 83 of circular cross section is machined in the bushing support 15 on the axis 17 (FIG. 1). In the illustrated embodiment, the axis 17 is non-parallel with the axis of rotation 14 of the rotor 11, although this is not essential. The bushing 16 mates in the hole 83, seating against a shoulder 84, and is held in position by a set screw 85. The bushing 16 is capable of rotational adjustment and may be retained in a chosen rotational position by the tightening of the set screw 85. The bushing 16 may also be readily removed from the bushing support for replacement.

The bushing 16 is of electrically non-conductive material and supports the welding torch 18 within the opening 86 machined in the bushing. The axis of the opening 86 is aligned with the axis 21 of the tip 19 of the weld torch 18. In the illustrated apparatus, the axis 21 is non-parallel with the axis 17 of the bushing 16. The weld torch may be of any suitable construction, but is preferably a tungsten inert gas torch assembly of a type generally known in the art. The diameter of the torch body is selected to provide a clearance with its mating fit in the insulator bushing 16 to allow the torch 18 to rotate freely in the insulator. At the same time, axial movement of the torch in the insulator bushing is restrained through the engagement of a pin 87 which is threadably adjusted into a space defined between two axially spaced collars 89 and 91 on the torch body. As the rotor 11 rotates about the axis 14, thus orbiting the torch 18, the torch is free to rotate within the insulator bushing. The torch thereby maintains a fixed orientation with respect to the stationary main housing 33. Thus, the cables that connect the welding power supply with the electrical power leads and gas hose, not shown, and which connect to the assembly indicated generally at 93 do not twist as the rotation of the rotor is under way.

In order to locate the apparatus with respect to the tube being welded, a locating counter bore is machined concentric with the axis of rotation of the rotor 11 to accept a replaceable locator arm 95. The locator arm has a diameter to accept a replaceable locator sleeve 97 having a pair of axially spaced locators 99 and 101 thereon which are sized to mate with the interior diameter of the tube being welded. The locator sleeve 97 may be readily slipped off the locator arm 95 by depression of a spring loaded detent 103 on the far end of the locator arm 95. At the same time, the locator sleeve 97 may rotate freely on the locator arm.

As previously mentioned, the welding torch 18 is of a suitable conventional design which provides for water cooling of the torch body and inert gas infeed to the welding area. A tungsten weld electrode 19 is held in position by suitable collets and holders, not shown. An insulator ring 105 is provided to isolate the torch body from adjacent metal surfaces. A ceramic cup 107 at the lower end of the torch surrounds the electrode 19 for the purpose of directing purge gas to the point of arc impact, as is known in the art.

The foregoing arrangement allows adjustment of the distance between the electrode 19 and the axis of rotation 14 of the rotor to thereby adjust the diameter of the orbiting path of the electrode through suitable adjustment of the position of the bushing support 15 in the rotor 11. At the same time, the attitude of the electrode 19 may also be selected by utilizing a bushing 16 having a desired angle of the opening 86. The opening 86 may also be at an angle with respect to the bushing axis 17. For example, the angle of the opening 86 may be machined so that the axis 17 is 3° from being parallel with the axis 14.

Three interchangeable insulator bushings may be provided for a given apparatus, having angled holes of 0°, 3° and 7°. A weld torch assembly 18 set in the insulator bushing with a 3° angle that is in turn set in the bushing support 15 with the angles aligned in the same direction would position the torch tip axis 21 at a 6° angle relative to the axis of the rotor. If the insulator bushing and bushing support angles were coplanar in opposition to each other, the axis 21 would be parallel with the axis 14. Combinations of insulator and carrier angles allow the choice of any preselected torch inclination with respect to the axis of the rotor. The aforementioned 7° insulator bushing could be positioned such that the torch inclination could be 10° toward the center of the tube being welded or 4° away from the center.

If desired, fine adjustment may be accomplished by rotating the bushing 16 in the bushing support 15 so the bushing axis - tip axis and bushing axis - rotor axis angles are not coplanar. Although the weld tip, in such a case, may not lie in a plane including the rotor axis 14, this deviation may be tolerable in operating the device.

The lower portion 25 of the rotor 11 is provided with a series of deep fins 109 machined in its outer diameter. These fins increase the surface area of the rotor body for the purpose of facilitating the dissipation of heat to the atmosphere. A series of ports 111 are machined in the main housing 33 spaced to coincide with the fins to allow direct access to the exterior and allow heat to escape to the atmosphere.

Figure 4:
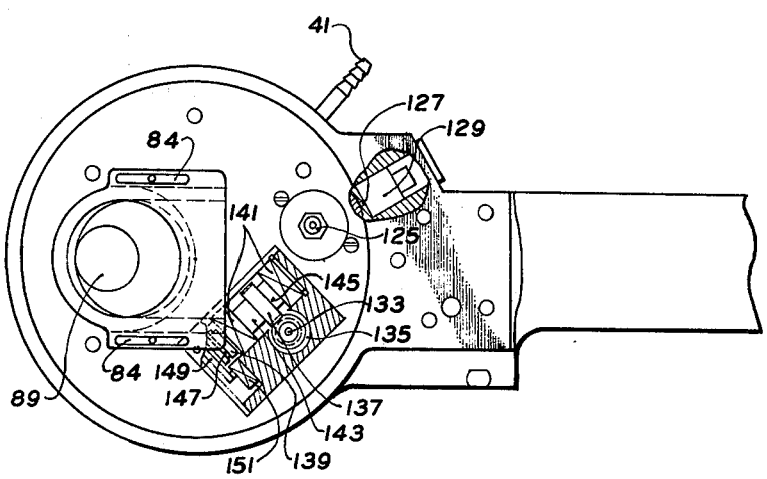
FIG. 4 is a top end view of the apparatus of FIG. 1 with parts in section.

As previously mentioned, it is desirable to direct a wire filler metal to the arc impact area. To this end, a wire feed motor 113 is mounted on the upper section 23 of the rotor 11. Current to operate the motor 113 is conducted to the motor from the plug 53 through leads 115 which pass through the handle portion 47 and appendage 45 in an opening 117 therein. An electrical insulator ring 119 surrounds the upper portion 23 of the rotor 11 and supports two electrical conductor rings 121 and 123. The conductor rings are internally wired to a coaxial insulated plug receptacle 125, shown in FIG. 4. The receptacle 125 is permanently located in the upper rotor portion 23. Two carbon brushes 127 are held in position in the main housing 33 by an electrically insulated brush holder 129. The carbon brushes are wired to the leads 115. Thus, current to drive the wire feed motor 113 passes from the plug 53 through the leads 115, brushes 127, rings 121 and 123 to the lead plug receptacle 125. A short detachable two lead phono jack plug 127 (FIG. 2) connects the motor to the receptacle 125.

The wire feed assembly itself includes a housing 131 which fits into a pocket in the upper rotor portion 23 and which may be removed in a situation where feed wire is not required. The wire feed motor 113 is mounted on the housing 131 and drives an output shaft 133 to which a worm 135 is mounted. The worm engages a worm gear 137 which is attached to a common shaft 139 supported in axially spaced roller bearings 141. Suitable spacers 143 and 145 maintain spacing of the gear 137 from the bearings on the shaft.

A guide groove 147 is machined on the outboard end of the shaft 139 and is provided with serrations therein. A cam shaft 149 carries a roller bearing 151 which is mounted in the rotor such that the roller bearing can be adjusted to pinch a wire between the bearing and the serrated groove 147. Suitable inlet guides, 153 and 155, FIG. 2, are provided attached to the rotor to guide a weld filler wire to engage the drive mechanism. A wire outlet guide 157, FIG. 3, and a clamp 159, are provided mounted on the lower portion 25 of the rotor 11 to direct the exiting wire to the welding arc impact area.

The wire feed rate may be set by adjusting the voltage input to the direct current motor 113 which thereby varies its rotational speed. Wire may be supplied to the weld area in a number of ways. Where small quantities are required, it is sufficient to feed individual pieces of a given length. Where usage is greater, it may be more convenient to locate a reel of wire on a stanchion to the upper portion 23 of the rotor 11 to provide a more continuous supply in longer runs.

Figure 7:
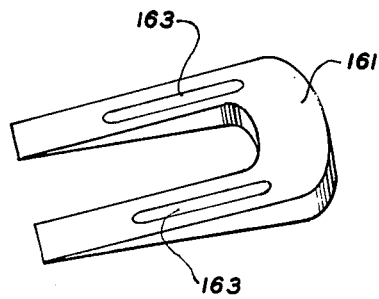
FIG. 7 is a perspective view of a part used in the embodiment of FIG. 6.
Figure 6:
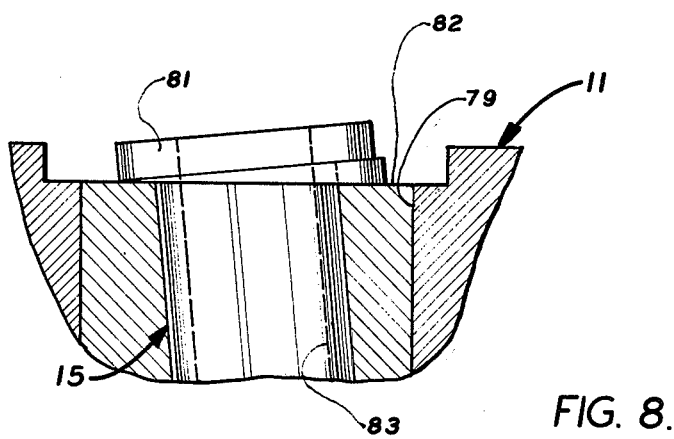
FIG. 6 is a partly sectional view illustrating a further embodiment of the invention.

The angle of the bushing support 15 with respect to the motor axis may be made adjustable. This is shown in FIGS. 6 and 7 by means of a wedge 161. The wedge is of generally U-shape tapering toward the open end. Slots 163 are provided in the parallel tynes of the U-shaped wedge to align with the slots 84 in the flange 81 of the support 15.

By means of the wedge 161, a high degree of versatility is introduced insofar as selection of the angle of the weld tip with respect to the rotor axis. A selection of wedges of different angles, in combination with bushing and torch body angles, enables the use of any tip angle desired.

Under certain circumstances, the weld between the tube and the tube sheet may become "rolled over". This condition occurs when, after the weld is completed, welding metal extends over the inside edge of the welded tube, thus reducing the clearance diameter of the tube at its end adjacent the tube sheet. In such a case, it may be difficult or impossible to remove the locator sleeve 97 from the tube. The spring plunger 103 allows the welding head to be withdrawn from the sleeve and the protruding metal may then be filed or ground away in order to remove the sleeve 97.

Figure 8:
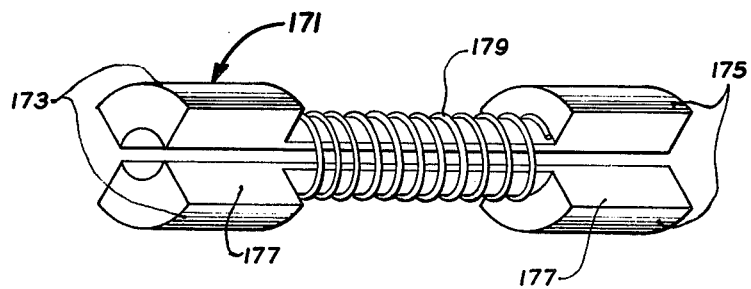
FIG. 8 is a perspective view of a modified element of the apparatus of the invention.

In FIG. 8, a locator sleeve which may be used advantageously in the presence of rolled over welds is shown. The sleeve 171 is split longitudinally into two segments and is provided with expanded diameter sections 173 and 175 at each end. Wedge-shaped sectors 177 are machined in the sleeve 171 and the section of the sleeve between the two expanded diameter portions 173 and 175 is surrounded by a coil spring 179. The coil spring 179 holds the two separate parts of the sleeve 171 together.

When the sleeve 171 is installed on the locator arm 95, the two longitudinal segments operate in the same manner as the solid sleeve 97 of the earlier described embodiment. When, however, the locator arm 95 is removed from the sleeve 171, the sleeve may now "collapse" radially and the smaller diameter of the collapsed sleeve will permit it to be withdrawn from the blocked tube.

It may therefore be seen that the apparatus of the invention is capable of readily locating itself in relation to the central axis of the tube to be welded to the tube sheet. The position of the weld torch may be adjustable both as to its distance from the axis of rotation of the rotor and to its inclination and position with respect to the weld region itself. The height of the torch above the weld area may also be adjusted. Filler wire may be readily incorporated into the weld at an infinitely variable rate of speed and heat is readily dissipated from the apparatus. When coupled with conventional power supplies and motor drive controls, it is possible to preprogram a complete weld cycle and thereby achieve substantially automatic welds.

Various modifications of the invention in addition to those shown and described herein will become apparent to those skilled in the art from the foregoing description and accompanying drawings. Such modifications are intended to fall within the scope of the appended claims.

What is claimed is:

1. Apparatus for welding a tube to a tube sheet, comprising, a rotor, means for supporting and rotating said rotor about a rotor axis, locator means for positioning said rotor axis with respect to the tube being welded, a weld torch having a non-consumable weld electrode projecting therefrom, means supporting said weld torch in said rotor for rotation with respect thereto with said weld electrode positioned spaced from said rotor axis, a weld filler wire feed mechanism mounted on said rotor, a feed mechanism drive motor mounted on said rotor, and brush means and commutator means mounted on said rotor and said rotor supporting means for conducting electricity to said drive motor on said rotor.

2. Apparatus according to claim 1 wherein said rotor means are provided with a plurality of cooling fins thereon.

3. Apparatus for welding a tube to a tube sheet, comprising, a rotor, means for supporting and rotating said rotor about a rotor axis, locator means for positioning said rotor axis with respect to the tube being welded, a bushing support mounted to said rotor for radial adjustment with respect to said rotor axis, a bushing, means interchangeably supporting said bushing offset from said rotor axis in said bushing support, and a weld torch supported in said bushing for rotation with respect thereto, and a weld filler wire feed mechanism mounted on said rotor, a feed mechanism drive motor mounted on said rotor, and brush means and commutator means mounted on said rotor and said rotor supporting means for conducting electricity to said drive motor on said rotor.

4. Apparatus for welding a tube to a tube sheet, comprising, a rotor, means for supporting and rotating said rotor about a rotor axis, locator means for positioning said rotor axis with respect to the tube being welded, a bushing support mounted to said rotor for radial adjustment with respect to said rotor axis, a bushing, said bushing support comprising a bushing block having an opening therethrough for carrying said bushing, said rotor having a slot therein extending radially with respect to said rotor axis, said bushing block being mounted to said rotor in said slot for adjustment therein radially with respect to said rotor axis, means interchangeably supporting said bushing offset from said rotor axis in said bushing support, and a weld torch supported in said bushing for rotation with respect thereto, said weld torch having a weld electrode projecting therefrom on a tip axis which is non-parallel with the axis of said bushing to allow selection of the angular relation between said rotor axis and said tip axis by the position of said bushing with respect to said bushing support.

5. Apparatus according to claim 4 including a wedge mounted between said bushing block and said rotor for supporting said bushing block at an angle with respect to said rotor.

* * * * *